(12) United States Patent
Oohira et al.

(10) Patent No.: US 6,332,717 B1
(45) Date of Patent: Dec. 25, 2001

(54) ROLLING BEARING FOR SUPPORTING ROTARY SHAFT OF DISK MEMORY DEVICE

(75) Inventors: Kouya Oohira; Masaki Egami; Yoshinobu Akamatsu, all of Mie (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/384,282

(22) Filed: Aug. 27, 1999

(30) Foreign Application Priority Data

Aug. 31, 1998 (JP) .................................................. 10-245770

(51) Int. Cl.[7] ...................................................... F16L 33/44
(52) U.S. Cl. .............................. 384/470; 384/527; 384/523
(58) Field of Search .................................. 384/470, 527, 384/523, 576, 572

(56) References Cited

U.S. PATENT DOCUMENTS 5,558,448 * 9/1996 Yabe et al. .......................... 384/470
5,575,570 * 11/1996 Uchiyama et al. .................. 384/470

FOREIGN PATENT DOCUMENTS 8-21450    1/1996 (JP) .

* cited by examiner

*Primary Examiner*—Lenard A. Footland
(74) *Attorney, Agent, or Firm*—Wenderoth, Lind & Ponack, L.L.P.

(57) ABSTRACT

A rolling bearing for a rotary shaft of a disk memory device which can maintain high-accuracy optical or magnetic recording ability over a long period of time. The rolling bearing supports a rotary shaft of a disk of disk memory device or a rotary shaft of an arm of a head, and has an inner ring having an inner diameter of 8 mm or less, and a retainer formed by molding an oil-containing resin composition comprising 40–94 wt % of a synthetic resin, 1–40 wt % of oil conducting material, and 5–30 wt % lubricating oil. Lubricating oil is dispersed uniformly in the composition, and can bleed onto the surface through the fibrous oil conducting material.

16 Claims, 5 Drawing Sheets

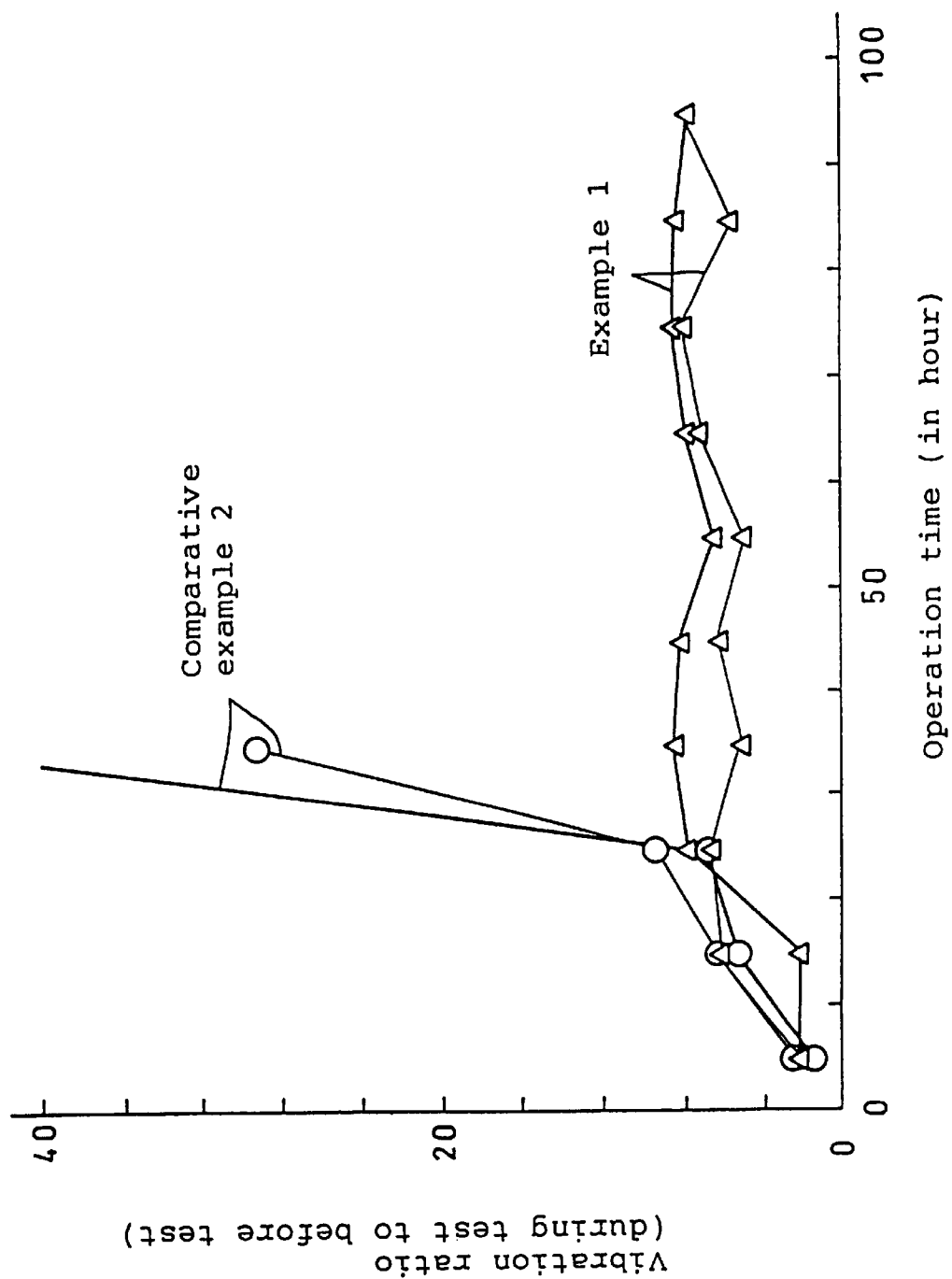

ROLLING BEARING FOR SUPPORTING ROTARY SHAFT OF DISK MEMORY DEVICE

BACKGROUND OF THE INVENTION

This invention relates to a rolling bearing for supporting a rotary shaft of a disk memory device such as an optical disk or a magnetic disk, and more particularly to a rolling bearing for supporting a rotary shaft of a spindle motor or a swing arm in a disk memory device such as a compact disk, a hard disk drive (HDD), or a mass storage floppy disk drive.

FIG. 1 shows a support structure for supporting the rotary shaft of a typical hard disk drive (HDD for short). This support structure comprises a pair of ball bearings 6 for supporting a rotary shaft 3 rotatably supporting a magnetic disk 2 through a hub 1, and another pair of ball bearings 7 supporting a rotary shaft 5 of an arm 4 carrying at its tip a magnetic head (not shown).

The pair of ball bearings 6 supporting the rotary shaft 3 of the magnetic disk 2 have their inner rings 8 mounted to the rotary shaft 3 so as to rotate together, and their outer rings 9 fixedly fitted in a fixed tubular member 11 of a spindle motor 10. The rotary shaft 3 is fixed to the center of a dish-shaped rotary member 12, and is rotated by a spindle motor 10.

The magnetic disk 2 rotatably supported by this structure is rotated at a high speed by the motor 10 through the shaft 3, while the swing arm 4 is, as its name suggests, swung so that its head can read and write data into and out of the disk.

The arm 4 is supported at its end remote from the head on the top of the rotary shaft 5. The rotary shaft is rotated about its axis by an actuator (not shown) such as a coil to pivot the arm 4 a predetermined angle to move its magnetic head to a predetermined position. As the shaft 5 swings, the head can thus read and write magnetic data in the effective memory area of the magnetic disk 2.

Heretofore, high-precision small ball bearings (miniature ball bearings: JIS B 0104 "bearing having outer diameter of less than 9 mm") have been used to support rotary shafts of hard disk drive. Bearings with dimensional accuracy and rotation accuracy of JIS 5 or over have been used.

Such rolling bearings have a retainer having the shape of a crown as shown in FIG. 3A or 3B. They comprise an annular retainer body having on its top surface a plurality of pairs of claws 21 arranged circumferentially at a predetermined pitch, each adjacent pair having opposed curved surfaces, defining a rolling element retaining pocket 22. A flat surface 23 as a reference surface from which the claws 21 protrude is formed between adjacent pockets 22.

The retainer of FIG. 3B has a plate-shaped upright wall 24 formed on each flat surface 23 to prevent leakage of grease.

If semisolid lubricant such as grease is used for lubrication of such roller bearings having retainers, lubricating (or stirring) resistance will be produced according to the viscosity of the lubricant. This increases the torque required to turn the rotary shaft supported by the bearing, and also causes torque fluctuations.

To prevent this problem, unexamined Japanese patent publication 8-21450 proposes to make the retainer itself from a lubricative composition comprising a mixture of a polyolefin resin and a lubricating oil.

One problem of the retainer disclosed in the abovesaid publication is that since the lubricating oil is retained by the highly oil-absorptive polyolefin resin, oil scarcely exudes onto the surface of the retainer. It is also difficult to keep oil exuded uniformly at a constant rate over a long period of time even if the oil is dispersed uniformly in the resin.

An object of the present invention is to provide a rolling bearing for supporting a rotary shaft of a disk memory device, which includes a retainer having good lubricative properties and which can lower and stabilize the torque required to turn the rotary shaft so that the disk memory device will exhibit high optical or magnetic recording performance over a long period of time.

SUMMARY OF THE INVENTION

According to this invention, there is provided a rolling bearing for supporting a rotary shaft of a disk of a disk memory device, comprising a retainer made from an oil-containing resin composition containing a synthetic resin as a main component to which are added fibrous oil conducting material and lubricating oil.

There is also provided a rolling bearing for supporting a rotary shaft of an arm carrying a head of a disk memory device, comprising a retainer made from an oil-containing resin composition comprising a synthetic resin as a main component, fibrous oil conducting material and lubricating oil.

The oil-containing resin composition forming the retainer may comprise 40–94 wt % of a synthetic resin, 1–40 wt % of fibrous oil conducting material, and 5–30 wt % of lubricating oil. Also, as the rolling bearing, a miniature bearing having an inner ring having an inner diameter of 8 mm or less may be used.

The fibrous oil-conducting material may be solid fibers, or hollow fibers.

The retainer of the rolling bearing used in this invention contains lubricating oil in a uniformly dispersed state to a deep portion. The lubricating oil bleeds through the fibrous oil conducting material onto the surface from inside the retainer, so that the retainer shows good lubricating properties.

By providing solid fibers in the retainer as the conducting material for lubricating oil, the lubricating oil present inside passes the surfaces of the fibers as the conducting material (that is, interface between the synthetic resin and fibers), and bleeds stably onto the surface of the retainer over a long period of time, so that it shows good lubricating properties.

Also, if hollow fibers (each having a through hole extending in the axial direction of the fiber) are used as the conducting material for lubricating oil, the lubricating oil present inside passes the holes of the hollow fibers, and the fiber surfaces (that is, interfaces of the base resin and fibrous filler), and bleeds onto the surface of the retainer at a stable rate over a long period of time, so that it shows good lubricating properties.

If the fibrous oil conducting material and lubricating oil are sufficiently mixed together beforehand, oil will be always present on the surface and/or in hollow portions of the fibrous oil conducting material, so that the lubricating oil bleed onto the sliding surface at a stable speed, so that the rolling bearing shows better lubricating properties. Thus, the rotary shaft of the disk memory device rotates stably with low torque.

Other features and objects of the present invention will become apparent from the following description made with reference to the accompanying drawings, in which:

BRIEF DESCRIPTION OF THE DRAWINGS

FIG. 4 is a graph showing the relationship between the operating time and the vibration ratio for the miniature bearings of Examples and Comparative Examples.

DETAILED DESCRIPTION OF THE PREFERRED EMBODIMENT

Figure 1:
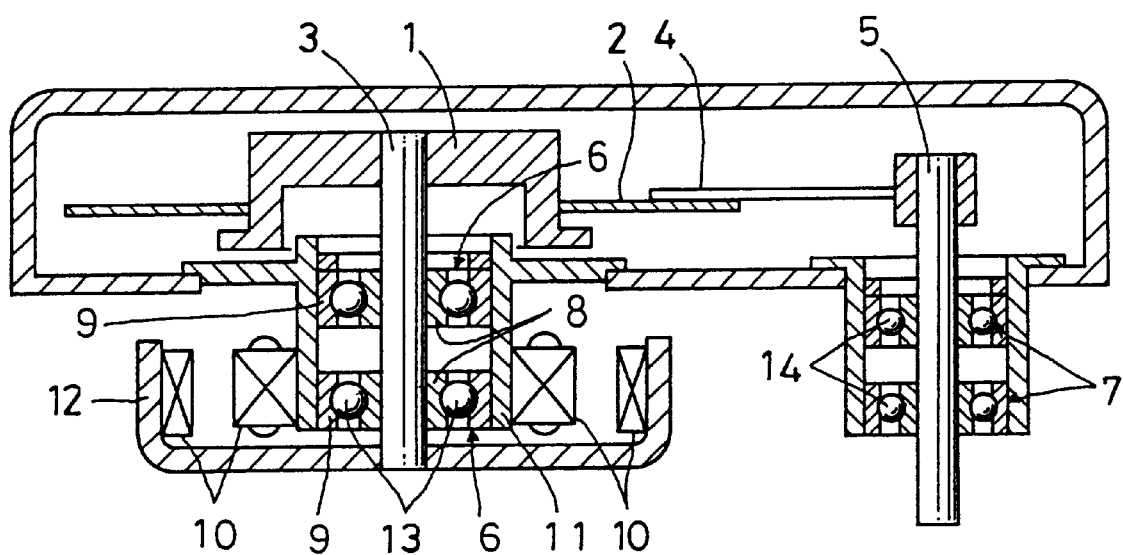
FIG. 1 is a sectional view of a support structure for a rotary shaft of a hard disk device.

Synthetic resins used in this invention are preferably heat-resistant and oil-resistant ones, such as polyamide, polyacetal, polyethyleneterephthalate, polybutyleneterephthalate, polycarbonate, polyphenylene sulfide, polyethersulfon, polyetherimide, polyamideimide, polyetheretherketone, and thermoplastic polyimide. Among them, polyamide resins are particularly preferable because they are heat-resistant and oil-resistant and still inexpensive.

Polyamide resins include aliphatic polyamide resins such as polyhexamethylene adipamide (6, 6-nylon), polyhexamethylene azeramide (6, 9-nylon), polyhexamethylene sebasamide (6, 10-nylon), polyhexamethylene decamide (6, 12-nylon), polytetramethylene adipamide (4, 6-nylon), polycaprolactum (6-nylon), polylauric lactam (12-nylon), poly-11-amino undecane (11-nylon), and polymetaxylene adipamide (nylon MXD-6), and aromatic polyamide resins such as polymetaphenylene isophthalamide, polyparaphenyleneterephthalamide, and polymetaxylilene adipamide (nylon MXD-6). They may be used alone or in combination.

Fibrous oil conductors usable in the present invention include glass fiber, pitch carbon fiber, PAN carbon fiber, aramide fiber, alumina fiber, boron fiber, silicon carbide fiber, boron nitride fiber, silicon nitride fiber, and metallic fiber. Glass fiber is especially preferable as an oil conductor because it is inexpensive and easily available.

If a fibrous oil conductor made of solid fiber is used, it should be added by 1–40 wt %, preferably 5–35 wt %, with respect to 40–94 wt % synthetic resin. If less than 1 wt %, no sufficient oil passages through which lubricating oil bleeds onto the retainer surface would be formed between the fibers and the resin matrix, so that it is impossible to supply a sufficient amount of oil to the rolling elements. This shortens the bearing life. If over 40 wt %, moldabiltiy would impair.

Fibrous oil conductors made of hollow fiber usable in this invention include polyester hollow fibers (RUBLO made by TOYOBO) for garments and polyester hollow fiber (Airo capsule dry made by TEIJIN). In use, they are cut short. Hollow fibers used for filtering support pipe used as filters may also be used. As hollow fibers, fibers having a longitudinal hole, or hollow yarns having many through holes may be used cut short. Hollow yarns for filtering for artificial hearts or blood purification may be used.

If hollow fibers are used as the oil conductor, they should be added by 1–30 wt %, preferably 5–25 wt %, with respect to 50–95 wt % synthetic resin. If less than 1 wt %, no sufficient oil passages through which oil bleeds onto the retainer surface would be formed between the fibers and the resin, so that it is impossible to supply a sufficient amount of oil to the rolling elements. This shortens the bearing life. If over 30 wt %, moldabiltiy would impair.

If solid fibers are used as the oil conductor, such fibers should preferably have a fiber (outer) diameter of 3–25 μm and a fiber length of 100–6000 μm.

If the fiber diameter is less than 3 μm, fibers tend to break during kneading/molding, so that lengths of fibers in the product would decrease. Such short fibers cannot conduct oil. If the fiber diameter is greater than 25 μm, the specific surface area of fibers would decrease, so that the fibers could not conduct oil sufficiently. In view of these facts, fibers having a diameter of 5–20 μm are more preferable. If the fiber length is shorter than 100 μm, such short fibers would not function sufficiently as oil conductors. If the fiber length is longer than 6000 μm, moldability would impair. In view of these facts, fibers having a length of 100–5000 μm are more preferable.

If hollow fibers are used as the oil conductor, such hollow fibers should preferably have a diameter of 25–75 μm and a length of 50–6000 μm.

If the fiber diameter is less than 25 μm, the volume of the longitudinal bores in the fibers tend to be so small that the fibers cannot retain a sufficient amount of oil. The oil conductor will thus lose its oil conducting function. If the fiber diameter is greater than 75 μm, the longitudinal bores would be so large that oil tends to bleed too quickly onto the retainer surface and be used up. This makes it impossible to keep supplying oil over a long period of time. In view of these facts, fibers having a diameter of 30–70 μm are more preferable. If the fiber length is shorter than the above range, such short fibers would not function sufficiently as the oil conductor. If longer than the above range, moldability would impair. In view of these facts, fibers having a length of 100–5000 μm are more preferable.

Lubricating oils usable in the present invention includes mineral oils such as spindle oil, refrigerating machine oil, turbine oil, machine oil and dynamo oil, synthetic oils such as hydrocarbon, ester, polyglycol, silicone oil, fluorinated oil, and other ordinary oils.

Lubricating oil should be added by 5–30 wt %, preferably 10–25 wt %. If less than 5 wt %, the amount of oil supplied from the retainer would be too small to sufficiently lubricate the rolling elements. This shortens the bearing life. If over 30 wt %, slip would occur between screws and the resin composition, thus making unstable the feed rate of pellets into the molding machine. Also, this will deteriorate the dimensional accuracy and mechanical properties of the retainer.

Fillers as listed below may be added to beef up the mechanical strength of the lubricating composition and to improve moldability: minerals such as calcium carbonate, talc, silica, clay and mica: inorganic whiskers such as titanate whiskers and aluminum borate whiskers: inorganic woven such as glass fiber, silicon nitride fiber, asbestos, silica wool and metallic fiber: carbon black, graphite, carbon fiber, alamide fiber, polyester fiber, and thermosetting resins such as polyimide resin and polybenzoimidazole. Other usable additives include polytetrafluoroethylene, boron nitride, molybdenum disulfide, and tungusten disulfide. In order to improve the heat conductivity of the lubricating composition, carbon fiber, metallic fiber, graphite powder, or zinc oxide may be added.

Other additives ordinarily added to synthetic resins may also be used, provided they are used in moderate amount so as not to impair the advantages of this invention. Such additives include releasing agents, flame-retardants, antistats, weather resistance improvers, antioxidants, colorants, industrial lubricants. How they are added is not limited.

In manufacturing the oil-containing resin composition according to this invention, materials may be mixed together using any known method. For example, they may be mixed in a mixer such as a Henschel mixer, ball mill or tumbler mixer, and the material mixture thus formed is fed to an injection molder high in melt-mixing ability, or a melt extruder (such as a twin-screw extruder), or they may be melt-mixed beforehand using heat rollers, a kneader, a Banbury mixer, or a melt extruder.

The base resin, fibrous oil conductor and lubricating oil may be mixed together at one time, or the fibrous oil conductor and the lubricating oil may be mixed together first, and then this mixture and the resin may be mixed together.

If hollow fibers are used as the oil conductor, the inner spaces of the fibers are preferably filled with oil e.g. by soaking the fibers in lubricating oil and treating under reduced pressure to remove air and water in the spaces. By removing excess oil after impregnation, you will get oil-containing fibers containing oil in the hollow fiber. For efficient impregnation, they should preferably be impregnated while heating.

If the fibrous oil conductor is formed by cutting yarn-like fibers, both ends of some fibers may be closed so that oil cannot enter the inner spaces of such fibers. Thus, care must be taken to use fibers cut not to close fiber ends.

The lubricating resin composition according to the present invention may be manufactured by any of extrusion molding, injection molding, compression molding, vacuum molding, blow molding and foam molding, but injection molding is the most preferable.

Provided the lubricating properties of the resin composition of the present invention are not impaired, in the stage of an intermediate product or an end product, it may be subjected to a chemical treatment such as annealing or a physical treatment to improve its physical properties. Annealing may be carried out in lubricating oil to suppress absorption of water into the resin.

A rolling bearing having a retainer made from the resin composition according to the present invention may be subjected to oil plating in which it is immersed in lubricating oil diluted to a suitable concentration with a volatile organic solvent to form a uniform film on the bearing surface. Lubricating oil for oil plating may or may not be of the same kind as the oil contained in the resin composition. Specifically, it may be an ester oil such as 2-ethylhexylsebacate, a polyol ester oil which is an esterified pentaerythritol or trimethylolpropane, mineral oil, poly-α-olefin oil, or alkyldiphenylether oil. To the lubricating oil for oil plating, small amounts of rust preventives, antioxidants or oiliness improvers may be added. Rust preventives include barium sulfonate and calcium sulfonate. Antioxidants include 2, 6-di-tert-butyl-p-cresol. Oiliness improvers include oleic acid, and tricresyl phosphate.

Figure 2:
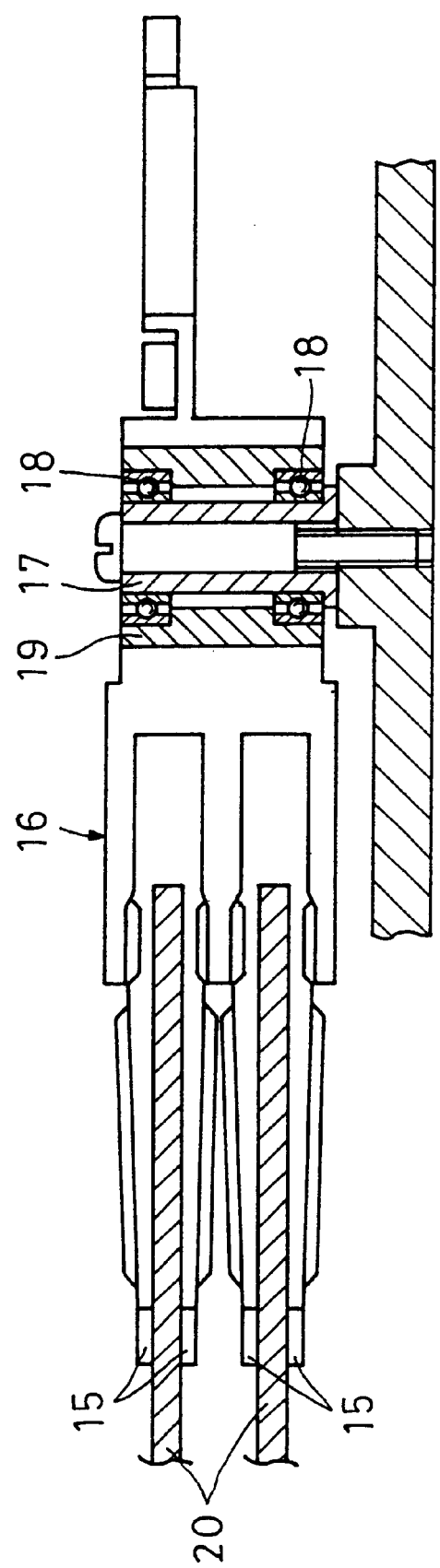
FIG. 2 is a sectional view of a support structure for a rotary shaft of a swing arm of a hard disk device.
Figure 3A:
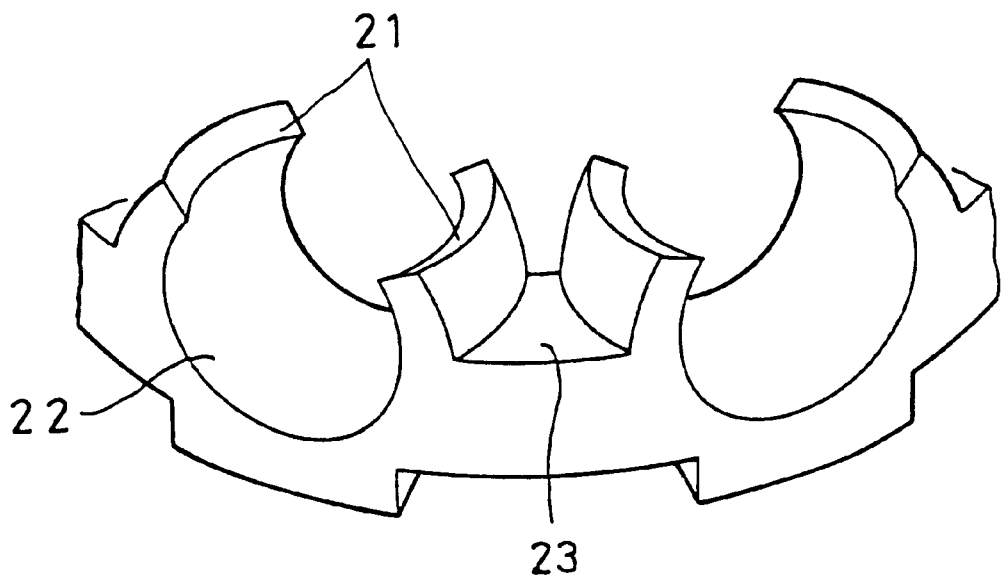
FIGS. 3A and 3B are partial perspective views of a crown-shaped retainer for a rolling bearing.
Figure 3B:
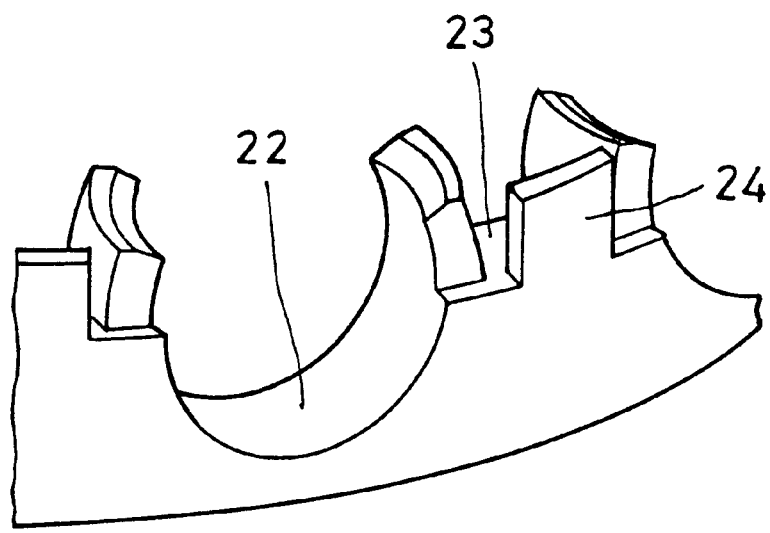

Rotary shaft support structures for disk memory devices may be, besides the one described using FIG. 1, a support structure using a swing arm as shown in FIG. 2.

Shown in FIG. 2 is a support structure for a shaft 17 supporting swing arms 16 carrying two pairs of magnetic heads 15 for reading and writing magnetically recorded data. The swing arms 16 are supported at their bases by two vertically spaced rolling bearings 18 and their housing 19. By pivoting the swing arms 16 a predetermined angle about the shaft 17 with a voice coil motor (not shown), their tips are pivoted by the predetermined angle, so that the two pairs of magnetic heads 15 are moved to predetermined positions of two hard disks 20.

EXAMPLES AND COMPARATIVE EXAMPLES

Description is made of Examples 1–6 and Comparative Examples 1–6 in which are used retainers made from oil-containing resin compositions in which are mixed solid fibers as fibrous oil conductors.

A polyamide resin (CM1001 made by TORAY) as a heat-resistant, oil-resistant resin, glass fiber (CS03MA497 made by Asahi Fiber Glass Co. chopped strand, fiber length 3 mm, fiber diameter 13 $\mu$m) as a fibrous oil conductor, and an ester oil (UNISTER H481R by NIPPON OIL & FAT Co., LTD.) as a lubricating oil were used and mixed at the rates shown in Table 1. Glass fiber and ester oil were pre-mixed in a Henschel mixer to uniformly disperse ester oil on the glass fiber surface. Then, polyamide resin was put in the Henschel mixer to mix the polyamide resin, glass fiber and ester oil together.

The mixture was then melt-kneaded in a twin-screw extruder (BT30 made by Research Laboratory of Plastics Technology Co., Ltd.) at 235° C. to form pellets. The pellets were injection-molded at 240° C. to form articles having a predetermined retainer shape (that of model 684, 6.9 mm dia.×5.3 mm×1.9 mm).

As Comparative Article, a grease-filled article (2 mg of grease, MULTEMP SRL made by Kyodo Yushi Co., Ltd., filled) was also prepared.

These retainers were mounted in miniature ball bearings 4 mm in inner diameter, 9 mm in outer diameter, 4 mm wide (having inner and outer rings and rolling elements all made from bearing steel). To evaluate the bearing performance, rotation speed fluctuation rates (jitter), torque, operating sounds, and durability (in time) were measured in the following manner. The results are shown in Table 2.

Test pieces 100 mm diameter and 2 mm thick were formed by compression-molding the compositions shown in Table 1 in a mold heated to 240° C. For each test piece, the amount of lubricating oil lost by bleeding (that is, weight loss rate) was measured, and the results are shown in Table 2.

(1) Measurement of rotation speed fluctuation rate (jitter)

For each specimen, rotation speeds were measured using an FG jitter meter five times each for 30 seconds after 10-minute aging in which each specimen was rotated at 15000 rpm. The maximum (rotation speed fluctuation rate in %) and the average of the five-time measurements were measured.

(2) Measurement of torque

Torque (in gf·cm) was measured while each specimen was rotated at 15000 rpm under an axial load of 1 kgf.

(3) Operating sounds

The sound level (in dBA) produced from each specimen after it was rotated for 100 hours at 10000 rpm under an axial load of 0.5 kgf was measured.

(4) Endurance test

Each specimen was rotated at room temperature, at 10000 rpm under an axial load of 1 kgf until the vibration acceleration of the bearing increased to three times the initial value, and the time period taken to this point of time was measured. The target time was set at 3000 hours.

(5) Amount of lubricating oil lost by bleeding (rate of weight loss)

Each specimen was weighed when molded, wrapped in paraffin paper and was put in a thermostatic chamber kept at 80° C. for six hours with a 500-gram weight put thereon.

After the test, each specimen was weighed again. Then, the initial weight was divided by the lost weight, which is the difference between the weights before and after the test, to give the rate (%) of lost weight. This is expressed by the equation: rate of lost weight=(lost weight/initial weight)× 100. The lost weight is considered to be equal to the amount of lubricating oil lost by bleeding. Thus, the greater the rate of lost weight, the larger the amount of lubricating oil lost by bleeding.

As will be apparent from the results shown in Table 2, the bearings having the retainers (Examples 1–6) made from compositions comprising polyamide resin, glass fiber and lubricating oil at predetermined rates showed low rotation speed fluctuation rates at 0.011–0.013%, and also low torque at 0.4–0.6 gf.cm. The sound level was also low at 30–32 dBA. Further, it was possible to operate them for 3000 hours or over. Durability was thus satisfactory. This indicates that lubricating oil is being stably supplied onto the surface of the retainer through glass fibers. Further, for Examples 1–6, the rate of weight loss was 1.1–1.3%. This shows that a sufficient amount of oil bled.

In contrast, in Comparative Example 1, which contained no glass fiber, not enough lubricating oil was supplied, so that the rotation speed fluctuation, torque and sound level were all high compared with the Examples, which all contained glass fiber. Due to little bleeding of oil, the vibration level grew gradually with a reduction in the amount of oil on the surface. Durability was inferior too. The rate of weight reduction was as small as 0.1%, which indicates that the amount of bleeding was far from enough.

For Comparative Example 2, in which the retainer contained not lubricating oil but grease, grease scattered during operation and stuck on the ball rolling surface, thus increasing the rotation speed fluctuations. Also, resistance due to stirring of grease was large. As a result, torque was about ten times greater than in the Examples.

For Comparative Example 3, in which the content of glass fiber was as small as 2 wt %, enough lubricating oil was not supplied from inside the retainer. Durability thus was poor. Also, the rate of weight loss was only 0.1%, which means that bleeding of oil was insufficient.

For Comparative Example 4, the content of glass fiber was as high as 50 wt %, resistance to extrusion during molding was so great that it was impossible to mold into the shape of a retainer.

For Comparative Example 5, in which the content of lubricating oil was as high as 35 wt %, the screw of the mixer slipped during injection molding, making it impossible to supply enough pellets to the molding machine. As a result, it was impossible to mold into the shape of a retainer.

For Comparative Example 6, in which the content of lubricating oil was as small as 1 wt %, it was impossible to supply enough lubricating oil, so that the rotation speed fluctuations, torque and sound level were large compared with the Examples, which contained lubricating oil in suitable amounts. Also, since little lubricating oil bled onto the surface from inside the retainer, as the lubricating oil on the surface decreased, vibrations increased gradually. Durability was no good either. Also, the rate of weight loss was as low as 0.1%, which means insufficient bleeding of oil.

Description is now made of Examples 7–12 and Comparative Examples 7–12, in which oil conductors in the form of hollow fibers were used.

A polyamide resin (CM1001 made by Toray) as a heat-resistant, oil-resistant resin, hollow fiber of polyester (RUBLO by TOYOBO, fiber with a diameter of 45 μm, cut to 1 mm) as a fibrous oil conductor, and an ester oil (UNYSTER H481R by NIPPON OIL & FAT Co., LTD.) as a lubricating oil were used and mixed at the ratio shown in Table 3.

They were pre-mixed in a Henschel mixer, and then melt-kneaded in a twin-screw extruder (BT30 made by Research Laboratory of Plastics Technology Co., Ltd.) at 235° C. to form pellets. The pellets were injection-molded at 240° C. to form retainers having a predetermined shape (equivalent to Model 684, 6.9 mm dia.×5.3 mm dia.×1.9 mm).

As one of tests of Comparative Articles, a grease-filled article (2 mg of MULTEMP SRL of Kyodo Yushi Co., Ltd. filled as grease) was also prepared.

These retainers were mounted in test bearings in the form of miniature ball bearings 4 mm in inner diameter, 9 mm in outer diameter, 4 mm wide (having inner and outer rings and rolling elements all made from bearing steel) as in the Examples 1–6. To evaluate the bearing performance, rotation speed fluctuation rates (jitter), torque, operating sounds, and durability (time) were measured in the above-described manner. The results are shown in Table 4.

As will be apparent from the results shown in Table 4, the bearings including the retainers (Examples 1–6) made from compositions comprising polyamide resin, hollow fiber and lubricating oil at predetermined rates showed stably low rotation speed fluctuation rates at 0.011–0.013%, and also low torque at 0.4–0.6 gf.cm. The sound level was also as low as 30–32 dBA. Further, it was possible to operate them for 3000 hours or over. Durability was thus satisfactory. This indicates that lubricating oil is being stably supplied onto the surface of the retainer through glass fibers.

In contrast, for Comparative Example 7, which contained no hollow fiber, little lubricating oil was supplied, so that the rotation speed fluctuation rate, torque and sound level were all high compared with Examples, which contained hollow fibers. Due to little bleeding of oil, the vibration level grew gradually with a reduction in the amount of oil on the surface. Durability was poor too.

For Comparative Example 8, in which the retainer contained neither hollow fiber nor lubricating oil, grease was sealed instead. Thus, grease scattered and stuck on the ball rolling surface during operation, thus increasing rotation speed fluctuations. Also, resistance due to stirring of grease was large. As a result, torque was about ten times greater than in the Examples.

For Comparative Example 9, in which the content of hollow fiber was as low as 2 wt %, enough lubricating oil was not supplied from inside the retainer. Durability was thus inferior.

For Comparative Example 10, the content of hollow fiber was 35 wt %, the balance with the lubricating oil was not so good that the amount of lubricating oil contained in the hollow fiber was relatively small, so that the amount of bleeding oil was small. This resulted in large rotation speed fluctuations, torque and sound level when compared with Examples 7–12. Due to insufficient bleeding of oil, the lubricating oil on the surface ran out eventually. This resulted in an increase in the vibrations. Durability was as short as 150 hours.

For Comparative Example 11, in which the content of lubricating oil was as high as 35 wt %, the screw of the mixer slipped during injection molding, making it difficult to stably feed pellets to the molding machine. As a result, it was impossible to mold into the shape of a retainer.

For Comparative Example 12, in which the content of lubricating oil was as low as 1 wt %, it was impossible to supply enough lubricating oil, so that the rotation speed fluctuations, torque and sound level were large compared with the Examples, which contained lubricating oil in suitable amounts. Also, since little lubricating oil bled onto the surface from inside the retainer, when the lubricating oil on the surface decreased, vibrations increased gradually. Durability was inferior too.

Due to excellent oil-supplying ability of the retainers according to the present invention, the rolling bearings into which are assembled the retainers of the present invention maintain good lubricating conditions with no seizure for a long period of time even though no grease was supplied. Since no grease was sealed, torque did not increase due to stirring of grease.

The rotary shaft support structure was subjected to an endurance test simulating the conditions when actually mounted in a disk memory device. That is, pellets made from the oil-containing resin compositions used in the manufacture of Example 1 and Comparative Example 1 were injection-molded at 240° C. to form retainers (equivalent to Model 695, 9.6 mm dia.×8.1 mm dia.×2.1 mm).

The retainers thus formed were mounted in miniature ball bearings 5 mm in inner diameter, 13 mm in outer diameter and 4 mm in width to form spindles mounted with an axial preload. The miniature bearings were rotated at 20000 rpm at 100° C. under conditions simulating the durable use conditions of the support structure of the rotary shaft of a disk memory device. The test was interrupted at predetermined intervals to measure the vibration value G of each bearing. FIG. 4 shows the ratio of the thus measured vibration value to the vibration value measured before the endurance test (value during the test/value before the test).

As will be apparent from FIG. 4, the miniature ball bearing of Example 1 was stable in the vibration ratio for about 100 hours. But for Comparative Example 2, the vibration ratio rose sharply in a short period of time of only about 30 hours to such a level that the continuation of the test was impossible. These results show that the rotary shaft support structure comprising the bearing of Example 1 is sufficiently durable as a support structure for a disk memory device.

Also, pellets made from the oil-containing resin compositions used in the Example 1 and Comparative Example 1 were injection-molded at 240° C. to form retainers (equivalent to Model 684, 5.7 mm dia.×5.0 mm dia.×1.0 mm).

Figure 5:
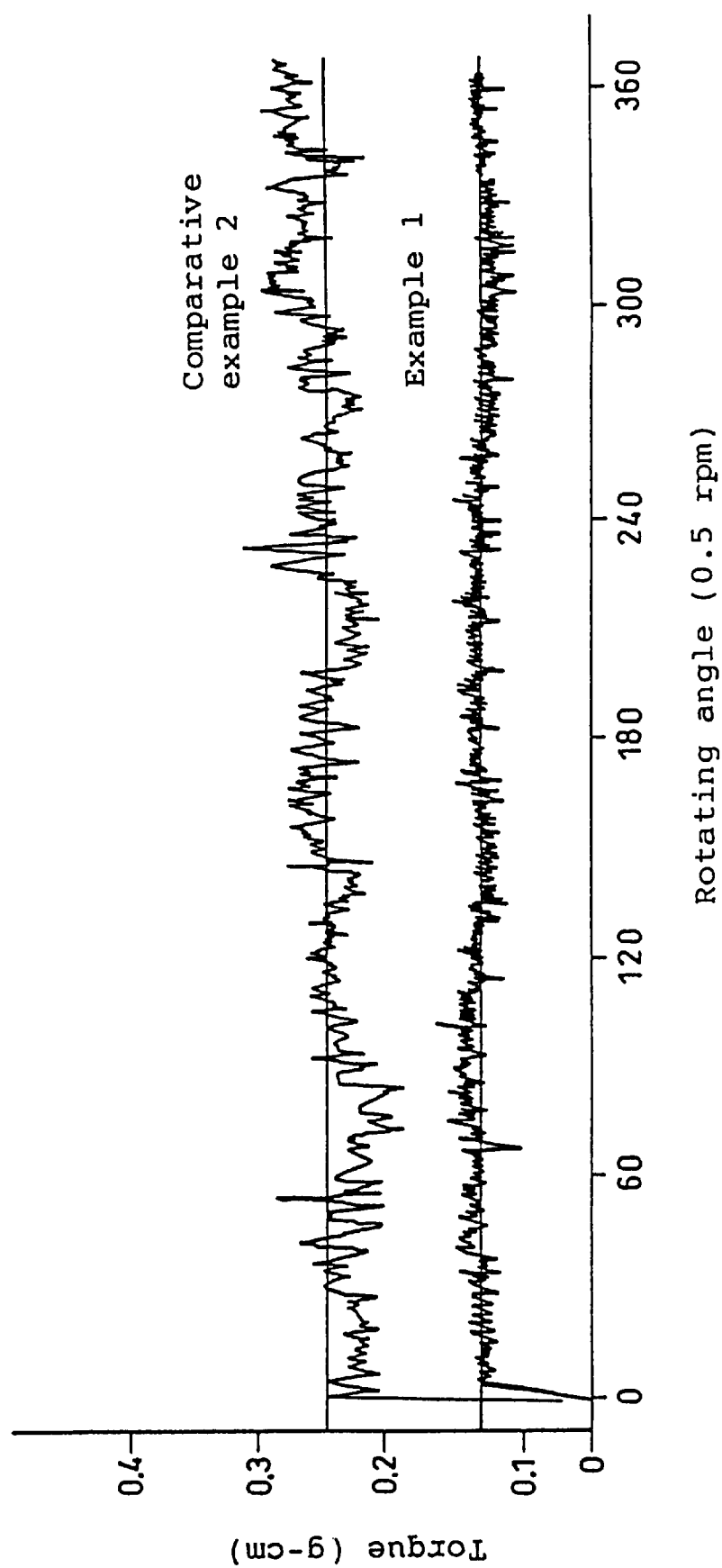
FIG. 5 is a graph showing the relationship between the rotation angle and the torque for the miniature bearings of Example and Comparative Example.

The retainers thus formed were mounted in miniature ball bearings 4 mm in inner diameter, 7 mm in outer diameter and 2 mm in width to form spindles assembled with an axial preload. For these spindle-supporting miniature bearings, the axial torque over the entire circumference (rotation angle 0–360°) was measured with a microtorque tester M10 made by a U.S. corporation called MRI. The results are shown in the graph of FIG. 5. The tester used is a measuring device that is widely used for torque control of vibration head support portions of hard disk drives.

As will be apparent from the results of FIG. 5, the miniature ball bearing of Example 1 is low and stable in torque fluctuations when compared with the bearing of Comparative Example 2. These results show that the rotary shaft support structure comprising the bearing of Example 1 is sufficiently low in torque and stable as a rotary shaft support structure for a disk memory device.

As described above, according to this invention, the rolling bearing for supporting the rotary shaft of a disk memory device has a retainer for supporting a rotary shaft of a disk or a rotary shaft of an arm carrying a head, said retainer being made by molding a synthetic resin composition containing a synthetic resin as a main component to which are added fibrous oil conducting material and lubricating oil. The bearing supporting the rotary shaft is thus low and stable in torque. The disk memory device can thus maintain accurate magnetic recording ability over a long period of time.

TABLE 1

| | (in wt %) | | | |
|---|---|---|---|---|
| | PA6 | glass fiber | lubricating oil | remarks |
| Example 1 | 80 | 10 | 10 | |
| Example 2 | 70 | 20 | 10 | |
| Example 3 | 55 | 35 | 10 | |
| Example 4 | 70 | 10 | 20 | |
| Example 5 | 60 | 20 | 20 | |
| Example 6 | 85 | 5 | 10 | |
| Comparative Example 1 | 80 | — | 20 | |
| Comparative Example 2 | 90 | 10 | — | grease sealed |
| Comparative Example 3 | 88 | 2 | 10 | |
| Comparative Example 4 | 40 | 50 | 10 | |
| Comparative Example 5 | 60 | 5 | 35 | |
| Comparative Example 6 | 84 | 15 | 1 | |

TABLE 2

| | Test Results | | | | | |
|---|---|---|---|---|---|---|
| | rotation speed fluctuation (%) | torque (gf · cm) | sound level (dBA) | endurance time (hour) | weight reduction rate (%) | remarks |
| Example 1 | 0.013 | 0.4~0.5 | 31 | >3000 | 1.1 | |
| Example 2 | 0.012 | 0.4~0.5 | 30 | >3000 | 1.2 | |
| Example 3 | 0.011 | 0.4~0.6 | 32 | >3000 | 1.1 | |
| Example 4 | 0.011 | 0.4~0.5 | 31 | >3000 | 1.3 | |
| Example 5 | 0.013 | 0.4~0.6 | 32 | >3000 | 1.3 | |
| Example 6 | 0.012 | 0.4~0.5 | 31 | >3000 | 1.1 | |
| Comparative Example 1 | 0.081 | 7~8 | 40 | 150 | 0.1 | |
| Comparative Example 2 | 0.051 | 5~6 | 40 | >3000 | | grease sealed |
| Comparative Example 3 | 0.033 | 0.7~0.9 | 40 | 200 | 0.1 | |

TABLE 2-continued

| | Test Results | | | | | |
|---|---|---|---|---|---|---|
| | rotation speed fluctuation (%) | torque (gf · cm) | sound level (dBA) | endurance time (hour) | weight reduction rate (%) | remarks |
| Comparative Example 4 | 0.063 | 5~6 | 40 | 150 | | unmoldable |
| Comparative Example 5 | — | — | — | — | | unmoldable |
| Comparative Example 6 | 0.033 | 0.7~0.9 | 45 | 200 | 0.1 | |

TABLE 3

| | (in wt %) | | | |
|---|---|---|---|---|
| | PA6 | hollow fiber | lubricating oil | remarks |
| Example 7 | 80 | 10 | 10 | |
| Example 8 | 70 | 20 | 10 | |
| Example 9 | 55 | 35 | 10 | |
| Example 10 | 70 | 10 | 20 | |
| Example 11 | 60 | 20 | 20 | |
| Example 12 | 85 | 5 | 10 | |
| Comparative Example 7 | 80 | — | 20 | |
| Comparative Example 8 | 100 | — | — | grease sealed |
| Comparative Example 9 | 88 | 2 | 10 | |
| Comparative Example 10 | 40 | 50 | 10 | |
| Comparative Example 11 | 60 | 5 | 35 | |
| Comparative Example 12 | 84 | 15 | 1 | |

TABLE 4

| | Test Results | | | | |
|---|---|---|---|---|---|
| | rotation speed fluctuation (%) | torque (gf · cm) | sound level (dBA) | endurance time (hour) | remarks |
| Example 7 | 0.013 | 0.4~0.5 | 31 | >3000 | |
| Example 8 | 0.012 | 0.4~0.5 | 30 | >3000 | |
| Example 9 | 0.011 | 0.4~0.6 | 32 | >3000 | |
| Example 10 | 0.011 | 0.4~0.5 | 31 | >3000 | |
| Example 11 | 0.013 | 0.4~0.6 | 32 | >3000 | |
| Example 12 | 0.012 | 0.4~0.5 | 31 | >3000 | |
| Comparative Example 7 | 0.081 | 7~8 | 40 | 150 | |
| Comparative Example 8 | 0.051 | 5~6 | 40 | >3000 | grease sealed |
| Comparative Example 9 | 0.033 | 0.7~0.9 | 40 | 200 | |
| Comparative Example 10 | 0.063 | 5~6 | 40 | 150 | |
| Comparative Example 11 | — | — | — | — | unmoldable |
| Comparative Example 12 | 0.033 | 0.7~0.9 | 45 | 200 | |

What is claimed is:

1. A rolling bearing for supporting a rotary shaft of a disk of a disk memory device, said rolling bearing comprising a retainer made from an oil-containing resin composition consisting of a polyamide resin as a main component, fibrous oil conducting material and an ester lubricating oil.

2. The rolling bearing as claimed in claim 1 wherein said oil-containing resin composition consists of 40–94 wt % of a polyamide resin, 1–40 wt % of fibrous oil conducting material, and 5–30 wt % of an ester lubricating oil.

3. The rolling bearing as claimed in claim 2 wherein said rolling bearing is a miniature ball bearing comprising an inner ring having an inner diameter of 8 mm or less.

4. The rolling bearing as claimed in claim 1 wherein said rolling bearing is a miniature ball bearing comprising an inner ring having an inner diameter of 8 mm or less.

5. A rolling bearing for supporting a rotary shaft of an arm carrying a head of a disk memory device, said rolling bearing comprising a retainer made from an oil-containing resin composition consisting of a polyamide resin as a main component, fibrous oil conducting material and an ester lubricating oil.

6. The rolling bearing as claimed in claim 5 wherein said rolling bearing is a miniature ball bearing comprising an inner ring having an inner diameter of 8 mm or less.

7. The rolling bearing as claimed in claim 5 wherein said oil-containing resin composition consists of 40–94 wt % of a polyamide resin, 1–40 wt % of fibrous oil conducing material, and 5–30 wt % of an ester lubricating oil.

8. The rolling bearing as claimed in claim 7 wherein said rolling bearing is a miniature ball bearing comprising an inner ring having an inner diameter of 8 mm or less.

9. A rolling bearing for supporting a rotary shaft of a disk of a disk memory device, said rolling bearing comprising a retainer made from an oil-containing resin composition consisting essentially of a polyamide resin as a main component, fibrous oil conducting material and an ester lubricating oil.

10. The rolling bearing as claimed in claim 9 wherein said oil-containing resin composition consists essentially of 40–94 wt % of a polyamide resin, 1–40 wt % of fibrous oil conducting material, and 5–30 wt % of an ester lubricating oil.

11. The rolling bearing as claimed in claim 10 wherein said rolling bearing is a miniature ball bearing comprising an inner ring having an inner diameter of 8 mm or less.

12. The rolling bearing as claimed in claim 9 wherein said rolling bearing is a miniature ball bearing comprising an inner ring having an inner diameter of 8 mm or less.

13. A rolling bearing for supporting a rotary shaft of an arm carrying a head of a disk memory device, said rolling bearing comprising a retainer made from an oil-containing resin composition consisting essentially of a polyamide resin as a main component, fibrous oil conducting material and an ester lubricating oil.

14. The rolling bearing as claimed in claim 13 wherein said rolling bearing is a miniature ball bearing comprising an inner ring having an inner diameter of 8 mm or less.

15. The rolling bearing as claimed in claim 13 wherein said oil-containing resin composition consists essentially of 40–94 wt % of a polyanide resin, 1–40 wt % of fibrous oil conducing material, and 5–30 wt % of an ester lubricating oil.

16. The rolling bearing as claimed in claim 15 wherein said rolling bearing is a miniature ball bearing comprising an inner ring having an inner diameter of 8 mm or less.

* * * * *